(12) United States Patent
Nachamkin

(10) Patent No.: US 11,177,677 B1
(45) Date of Patent: Nov. 16, 2021

(54) SYSTEM FOR CAPTURING ELECTRICAL CIRCUIT ENERGY OTHERWISE LOST TO CIRCUIT RESISTANCE HEAT

(71) Applicant: Jack Nachamkin, Glen Mills, PA (US)

(72) Inventor: Jack Nachamkin, Glen Mills, PA (US)

( * ) Notice: Subject to any disclaimer, the term of this patent is extended or adjusted under 35 U.S.C. 154(b) by 259 days.

(21) Appl. No.: 16/501,543

(22) Filed: Apr. 29, 2019

(51) Int. Cl.
| | | |
|---|---|---|
| *H02J 7/00* | (2006.01) | |
| *H02J 7/14* | (2006.01) | |
| *H02P 9/02* | (2006.01) | |
| *H02P 7/00* | (2016.01) | |
| *F03G 3/08* | (2006.01) | |
| *H02J 7/34* | (2006.01) | |

(52) U.S. Cl.
CPC ............... *H02J 7/007* (2013.01); *H02J 7/14* (2013.01); *H02P 7/00* (2013.01); *H02P 9/02* (2013.01); *F03G 3/08* (2013.01); *H02J 7/345* (2013.01)

(58) Field of Classification Search
CPC ....................................................... H02J 7/00
See application file for complete search history.

(56) References Cited

U.S. PATENT DOCUMENTS

| | | | |
|---|---|---|---|
| 7,109,671 B2 | 9/2006 | Bedini | |
| 9,124,213 B2 | 9/2015 | Rasco et al. | |
| 2012/0326641 A1* | 12/2012 | Sakai | H02J 1/16 318/400.3 |
| 2016/0137078 A1* | 5/2016 | Yun | B60L 58/20 307/10.1 |
| 2016/0200310 A1* | 7/2016 | Amemiya | B60W 20/00 701/22 |
| 2018/0226805 A1 | 8/2018 | Cao | |

* cited by examiner

*Primary Examiner* — Robert Grant
(74) *Attorney, Agent, or Firm* — Chris Papageorge

(57) ABSTRACT

The system is directed to enhancing the energy efficiency of electrical charging systems. The system is utilized in circuits that include a power source such as a battery feeding electrical current into an energy storage device such as a capacitor to charge the capacitor with electrical power. The system of the invention extracts energy from such circuits that would otherwise be converted into heat and thereby wasted. The system includes an energy storage and release device such as a motor that is connected to the circuit and converts the electrical energy therein that would otherwise be converted into heat into mechanical energy or electrical energy by means of monitoring and controlling electrical current flow through the system to maintain it at low and constant levels.

21 Claims, 6 Drawing Sheets

SYSTEM FOR CAPTURING ELECTRICAL CIRCUIT ENERGY OTHERWISE LOST TO CIRCUIT RESISTANCE HEAT

CROSS REFERENCE TO RELATED APPLICATIONS (not applicable)

STATEMENT REGARDING FEDERALLY SPONSORED RESEARCH OR DEVELOPMENT (not applicable)

THE NAMES OF PARTIES TO A JOINT RESEARCH AGREEMENT (not applicable)

REFERENCE TO A SEQUENCE LISTING (not applicable)

STATEMENTS REGARDING PRIOR DISCLOSURES BY THE INVENTOR OR A JOINT INVENTOR (not applicable)

BACKGROUND OF THE INVENTION

The invention relates to systems used to improve the efficiency of electrical circuit systems. Electrical circuit systems which are designed to store electrical energy typically generate heat. Since that heat is not productively utilized in such circuit systems, the heat that is generated is energy that is wasted.

Worldwide energy demands have been steadily increasing as more people in more countries use energy consuming technologies in their daily lives. Energy usage in the form of electrical energy is very desirable because it is non-polluting and is used to power so many devices and systems such as computers and many different types of machinery as well as many other devices. In addition, electric batteries are deemed more efficient at using energy to provide power than regular gasoline engines and natural gas turbine engines. Converting many other forms of energy into electrical energy, and the storage of electrical energy have also become more desirable than ever. Consequently, many systems for storing electrical energy have been developed to increase the power such systems can receive and/or discharge into other systems and devices. As a result, energy storage devices such as batteries have become larger and more capable of delivering increasingly higher amounts of electrical power. Improving their energy efficiency has attracted more interest than ever and some improvements in energy efficiency of such systems and devices have been made. However, commonly used conventional devices and systems for storing electrical energy utilize electrical circuits that have the inherent characteristic of producing heat. The heat produced is energy that more desirably should have gone into energy storage or otherwise productively utilized. Consequently, such conventional systems are wasteful of energy that is presently too precious to waste and likely to become more precious in the future as energy demands increase.

In the field of electrical energy generation, solar energy conversion systems have increasingly come into more common use as the cost of photovoltaic cells has decreased. However, a disadvantage of solar energy conversion systems is that solar rays are generally only available for approximately half of a 24 hour day. In addition, solar rays are not available for most of the day in many parts of the world due to cloud cover and other weather conditions. Also, at some latitudes, the intensity of the solar rays is not good and therefore the amount of energy that can be derived is not particularly good. Consequently, depending on location, solar energy is not reliably available in the amounts desired throughout the day for conversion into electrical energy. Therefore, a solution to such lack of reliable availability has been storage of electrical energy so that it may be available for use whenever needed rather than only when there is sunshine or only in locations where the solar energy has a relatively high intensity.

Photovoltaic cells used for converting sunlight into electrical energy are placed in arrays and used for many purposes by many different types of solar energy facilities. Companies producing and designing solar panels are receiving considerable funding from government sources in order to produce more efficient designs. An important way of improving the efficiency of solar panel systems is to improve the efficiency of systems used for storing their electrical energy in electrical energy storage devices.

Many automobiles have been designed that rely on batteries to provide their motive power. The batteries also are designed to receive electrical energy from an external source to charge the batteries sufficiently to enable them to power the automobile for a desired distance. Usage of the electrical power stored in batteries is deemed the preferred means of providing motive power to the automobile and, therefore, considerable funding has gone into improving their efficiency and effectiveness. However, they are not considered as practical as other systems. Due to the increasingly common uses of electrical energy storage devices in solar panel systems and electric automobiles to overcome their weak points regarding practicality, it has been seen as imperative that electrical energy storage systems be energy efficient.

The energy storage capability of an automobile battery used for motive power is very low in comparison to that of fossil fuel. The energy per unit mass of gasoline is over 12000 Wh/kg whereas, in contrast, that of a lithium-ion battery is approximately 200 Wh/kg. For an electric vehicle battery's mass to be made large enough to contain an amount of energy comparable to a tank of gasoline, the battery would have to weigh a ton. Therefore, such batteries depend on frequent and preferably energy efficient charging in order to pragmatically provide motive power.

A disadvantage of battery systems is that more energy is used to charge a battery than can be recovered from it. Companies that manufacture chargers may provide specifications that give the charger's efficiency. The charger efficiency value states how effectively a charger converts the true power going into the charger from the main power source compared to the power going out of the charger. The best chargers utilized for automobile applications may have charger efficiencies up to 93% but most are considerably less. Even so, the electrical power from such chargers that go into an automobile battery typically heats the battery or produces heat in another part of the circuit. This heat resulting from charging is a waste of energy. In addition, when some types of batteries get warm as they approach the end of their charging cycles, there is increased self-discharge of the batteries thereby further reducing energy efficiency.

For typical users of electric vehicles, protracted battery charging times are deemed undesirable and tend to be avoided by users whenever possible. Electric vehicle users thus opt for fast charging for reasons of convenience and to prolong the periods of availability for use of these vehicles. However, fast charging necessitates a substantial increase in the level of current going into the batteries. The high current level considerably reduces energy efficiency of the charging and reduces battery life. In fast charging of batteries, energy losses are not uncommonly 25%. Thus, as commonly practiced, charging of electric vehicle batteries is commonly very wasteful of energy.

Recognizing that after batteries reach approximately 50% charge charging stresses on the batteries increase and charging becomes much less efficient, designers of automobile battery charging systems have produced chargers that progressively decrease their charging current after the battery reaches 50% to 70% charge. Designers of laptop chargers have also incorporated such step charging methods in their designs in order to reduce stresses on the batteries and counter loss of charging efficiency and effectiveness. However, although an improvement, chargers incorporating such step charging methods nevertheless still produce heat and therefore waste energy.

As batteries used in electric vehicles (as well as in other applications) age their resistance increases and the battery cells increasingly become mismatched in capacity as well as resistance. This mismatch results in undue stress on weaker cells during the charging process. The increased resistance of such aging batteries results in more of the energy of charging being converted to heat and thereby wasted. Thus, aging of batteries produces decreased energy efficiency.

What is therefore needed is a means of charging an electrical energy storage device that is energy efficient. What is also needed is such a system that is capable of being incorporated into many types of electrical circuit systems that may be utilized to place electrical energy into suitable storage. What is also needed is such a system that is simple and inexpensive.

BRIEF SUMMARY OF THE INVENTION

It is a principal object of the present invention to provide a system for storing electrical energy that is energy efficient.

It is another object of the present invention to provide a system for storing electrical energy that is energy efficient and that may be incorporated into an electrical circuit.

It is an object of the present invention to provide a system for storing electrical energy that minimizes the degree of electrical circuit heat generated by the circuit of the system.

It is an object of the present invention to provide a system for storing electrical energy that minimizes the amount of electrical energy utilized in storing electrical energy.

It is an object of the present invention to provide a system for storing electrical energy that maximizes the amount of electrical energy stored in electrical energy.

It is an object of the present invention to provide a system for storing electrical energy that maximizes the circuit energy that may be utilized to perform desired work in addition to storing the desired electrical energy.

It is an object of the present invention to provide a system for storing electrical energy that can alternatively incorporate many different types of components to enhance its practicality by enabling it to be used in many different types of applications.

It is an object of the present invention to provide a system for storing electrical energy that is easy to use.

It is an object of the present invention to provide a system for storing electrical energy that is simple in design so that it is easy to manufacture.

It is an object of the present invention to provide a system for storing electrical energy that is simple in structure and function so that it has a high degree of reliability.

It is an object of the present invention to provide a system for storing electrical energy that has relatively few components so that there are few components that can malfunction or fail so that it has a high degree of reliability.

It is an object of the present invention to provide a system for storing electrical energy that is inexpensive.

The theory of operation of the energy efficient system of the present invention is based on certain principles. One of these is that half the energy that goes to charge a capacitor by a constant voltage DC source conducting current into an RC circuit is dissipated by the resistance in the circuit. This is independent of the size of the resistance. The same RC circuit energized by an appropriately chosen constant DC current can lower the energy dissipated by the resistance. The energy saved from resistance heating can be converted into usable mechanical energy. The mechanical energy can be converted into usable electrical energy. Extraction of energy from the circuit and its conversion into mechanical energy does not reduce the charge ultimately put into the capacitor. The charge on the capacitor at the end of the charging process remains the same despite extraction of the energy that would otherwise have become heat. Thus, this extracted energy may be productively utilized without adversely affecting the degree of charge placed in the capacitor. Since a battery is essentially a non-linear capacitor, the foregoing regarding capacitors applies also to batteries as well as other types of energy storage devices.

Basically, the present invention achieves its objective of providing improved energy efficiency in storing electrical energy by utilizing components that lower the electrical current flowing into the energy storage device and divert part of the current in the system such that it is available to do desired work or it is available to be directed into the energy storage device. In one embodiment, the system incorporates a dc motor that either receives electrical current to drive the motor or outputs electrical current to the energy storage device such that the motor's current output becomes electrical energy stored therein. When the motor is in its current input mode the current accelerates its rotor to a desired speed. At the desired speed, the motor may be switched to its current output mode in which the current therefrom is directed to the energy storage device thereby adding to the amount of electrical current previously received from the electrical power source of the circuit.

Introducing a motor as a circuit element in series in a charging circuit makes use of its back electromotive force (BEMF) to regulate the voltage seen by the storage device. At high speeds the BEMF is larger than at lower speeds. In series with a depleted storage device the motor speed is highest, subtracting from the source voltage, which restricts the initial current amplitude. As the voltage of the storage device increases, the motor will see a diminished potential at its terminals and will slow down. There will still be a restriction in the current to the storage device because even at lower speeds the BEMF subtracts from the source voltage that the storage device sees at its terminals. Eventually the storage device will come up to a voltage that with any residual motor BEMF will block any further charging. At this point either the motor is stopped or might still retain some rotational energy. If the motor is still running the residual energy in the rotating armature can be recovered by reversing the leads to the motor in such a way that the voltage seen by the storage device is a sum of the source voltage plus the residual BEMF of the motor. The lowered rate of current flow at all points of the charging cycle lowers the heat generated in the circuit resistance. This temporarily absorbed energy that would have gone into heat is stored in flywheel energy. It is released as the charging cycle proceeds.

In the embodiment incorporating a dc motor, the mechanical energy produced by acceleration of the rotor thereof by the circuit current (of an appropriately chosen constant value) flowing therethrough can be used to drive a flywheel. The kinetic energy of the rotating flywheel that is produced is available to do mechanical work or to be converted into usable electrical energy and fed back into the system. The electrical energy that results from conversion of the kinetic energy of the flywheel can be used to further charge the energy storage device. As a result, using the concept of the present invention, the state of charge of the energy storage device can be increased above that which the circuit of the original and conventional design can be capable of providing. In theory, all the energy that would have been lost as heat in the original circuit can be turned into mechanical energy and subsequently converted into electrical energy.

The motor or other such device can transfer all of the mechanical energy generated into a flywheel until the energy storage device has received all of the electrical energy available directly from the power source. However, in some applications, the amount of mechanical energy generated may be deemed excessive for the type of available setup. The large size of the flywheel or the high capacity of some other type of energy storage component required to store that amount of energy may be deemed impractical for some applications. Therefore, instead of waiting for the termination of the charging process, the flywheel or other such component may periodically transfer its stored energy out and later repeat the sequence of receiving and storing energy. Such a cyclic energy storage process thereby allows reduction of the size of the flywheel, or a reduction of the energy capacity or capability of another type of energy storage component that may be so utilized.

As mentioned above an alternative method of charging can be employed that drastically reduces the size of the mechanical flywheel. Theoretically half the energy of charging, say a capacitor, goes into heat. The motor/flywheel circuit element would have to have the capacity to store an enormous amount of energy during the charging cycle. This can be mitigated by periodically reversing the leads to the motor to allow the BEMF to assist the charging thus slowing down the motor. Sizing and timings are to be determined (TBD). The process can raise the current to the storage unit if the current during the reversal is not regulated. It is proposed that current regulation is to be incorporated as an enhancement to this inventive system. Care must also be taken to prevent back flow of current if the storage unit voltage goes above the source voltage.

A sensor is utilized in the electrical circuit to determine the current value flowing from the power source into the energy storage device. The lower the rate of current flow i.e., the lower the current value flowing into the energy storage device, the lower the production of undesired heat from resistance in the circuit. A motor or other such device that can draw energy from the circuit lowers the current flowing into the energy storage device and thereby lowers the rate at which the circuit resistance produces heat. The motor is therefore included in the circuit to reduce the current flowing therethrough to a desired low level. However, lowering the current flowing into the energy storage device also increases the time required to charge the energy storage device and a protracted charging time may be deemed undesirable for certain applications. Consequently, an optimum current value may be chosen for the current flowing through the energy storage device. Therefore, the sensor is preferably used to both increase the current flowing into the motor when the current flowing through the energy storage device is too high and decrease the current flowing into the motor when the current flowing through the energy storage device is deemed too low.

It is also important that the current flowing into the energy storage device be maintained at a constant level. In order to accomplish this desired constant current flow, the motor (or other such device) is controlled so that the electrical energy it draws from the circuit is maintained at a constant level. In this regard, if the motor speed is kept constant, then the electrical energy drawn can simultaneously be kept constant. Therefore, a sensor is preferably used to both determine the current value in the circuit and to enable proper alteration of the speed of the motor so as to thereby either raise or lower the current flow to a desired value.

If the current going through the capacitor (or other type of energy storage device) is kept low as well as constant, the energy losses of resistance are reduced. This may be done by, for example, using a voltage ramp type of circuitry. Maintaining a low, stable current flowing through the capacitor helps to effectively achieve the very desirable goal of maximization of energy efficiency.

Essentially, a chargeable battery is a non-linear capacitor. Therefore, the above set forth principles and concepts regarding capacitors and capacitor circuitry also apply to batteries used for energy storage such as in electric vehicle applications. A chargeable battery may therefore be substituted where the above description specifically refers to a capacitor.

The system of the present invention can ease the burden of designing more efficient photovoltaic cells by enabling a higher degree of capture of energy generated by the photovoltaic cells. A high proportion of the energy provided by solar panel systems cannot be obtained at the time electrical power therefrom is needed. Advantageously, the system of the present invention enables more of the electrical energy generated by such cells to be available through proper energy storage by using the system and concepts of the present invention that are directed to enhancing energy efficiency. The system of the present invention also can ease the burden of designing more efficient and cheaper fuel burning engines generating electrical energy for battery charging by enabling more of the electrical energy generated to be stored in the battery charged. In other energy generating systems and applications, the system of the present invention can improve their energy efficiency by making more of the energy available through more efficient storage thereby also reducing their overall cost.

DETAILED DESCRIPTION OF THE INVENTION

Figure 1:
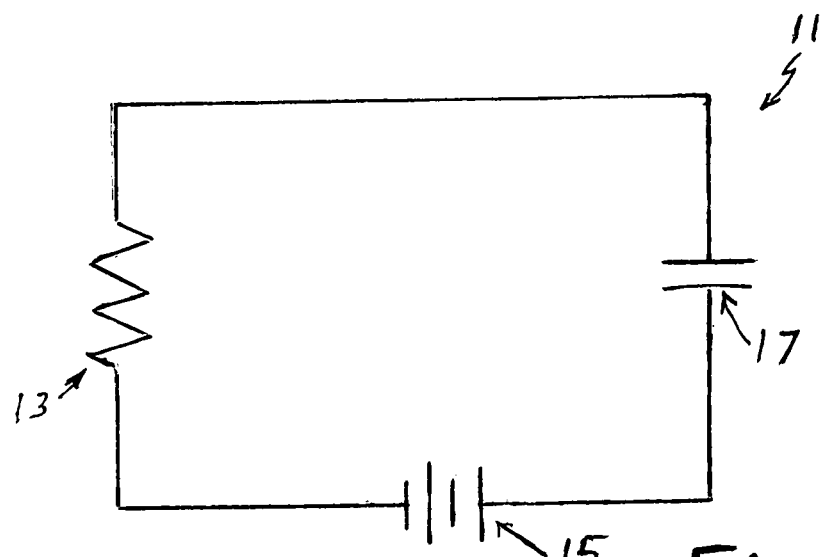
FIG. 1 is a schematic view of a conventional capacitor charging system illustrating the prior art.

Referring to the drawings, FIG. 1 shows a conventional capacitor circuit 11. The resistance of the circuit 11 is equivalent to and represented by the resistor 13. The power source 15 supplies a constant DC voltage Va to the capacitor 17 that is in series with the resistor 13. The current IA is time varying and it deposits a charge Qa in the capacitor 17. The total energy output from the power source 15 is VaQa. The energy stored in the capacitor 17 is ½VaQa i.e. only half the energy output VaQa of the power source 15 in the charging process. The other half of the total energy output VaQa is dissipated as heat in the resistor 13.

Figure 2:
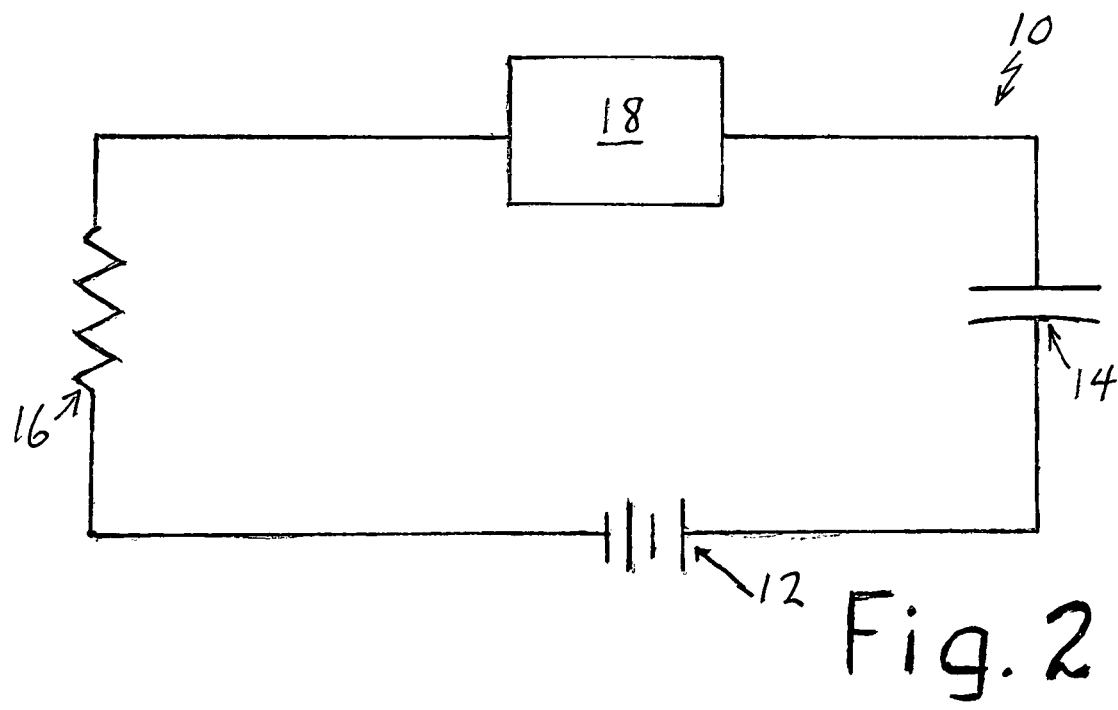
FIG. 2 is a schematic view showing a circuit system of the present invention illustrating the conceptual basis of the invention and similar to the circuit shown in FIG. 1 except that an electronic component is added that renders the system of FIG. 2 fundamentally in structure and function distinct from the conventional system of FIG. 1.

FIG. 2 shows the system of the invention in its first embodiment 10. Embodiment 10 includes an electrical power source 12, an energy storage device 14 which is preferably a capacitor 14 and a resistor 16 (which may simply be representative of the circuit resistance), as in FIGS. 1 and 2. Thus, FIG. 2 essentially shows a charging circuit such as shown in FIG. 1. However, also includes an element 18 which is inserted in series with current I flowing through it. The element 18 is generally an energy storage and release device and preferably an electro-mechanical machine the terminal voltage V(t) of which can be adjusted in such a manner that the current I is kept constant.

Figure 3:
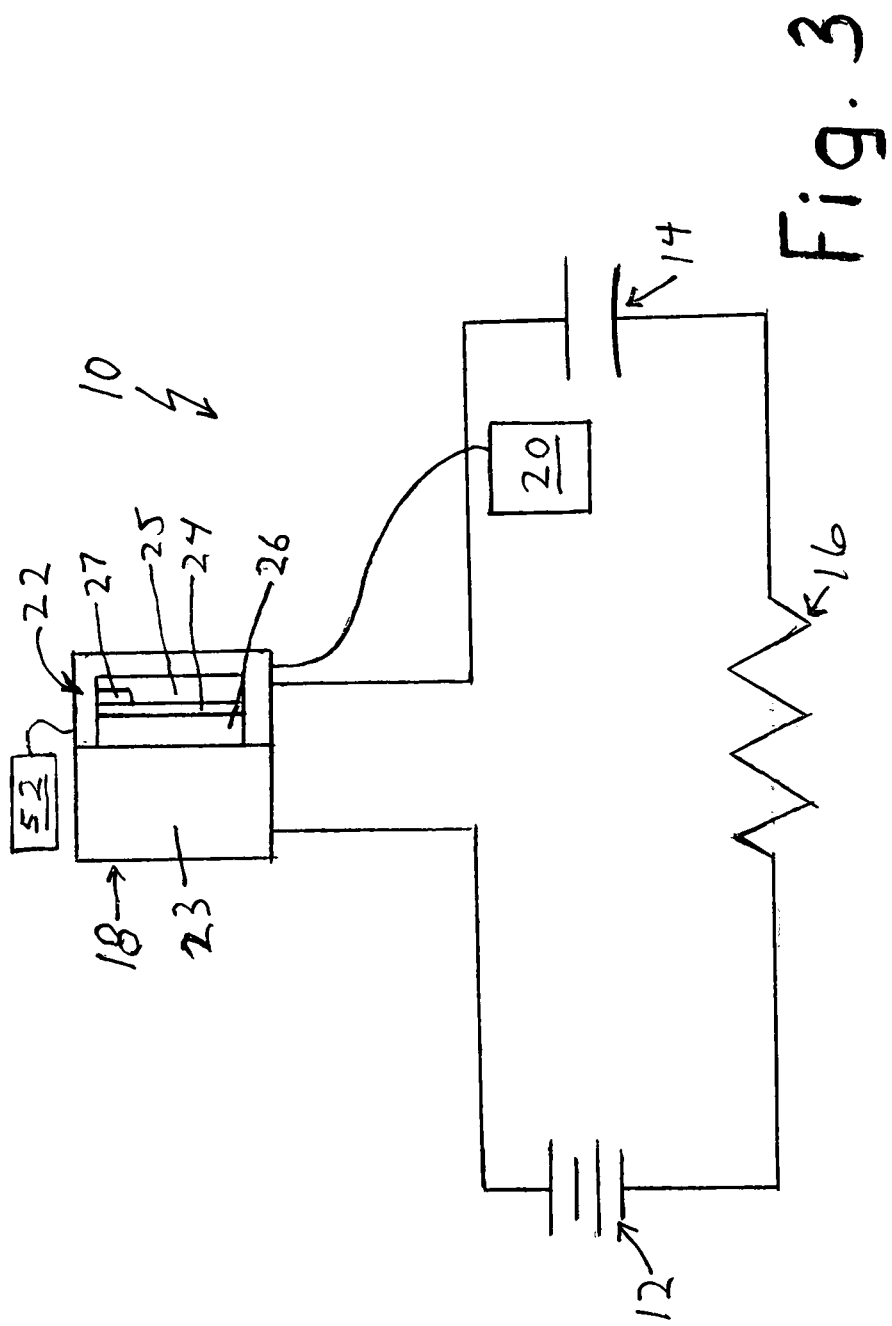
FIG. 3 is a schematic view of an electric circuit system of a first embodiment of the present invention illustrating an important feature of the present invention which is that the current in the circuit is constant yet the circuit does not dissipate energy and this is due solely to the added element.

As shown in more detail in FIG. 3, in embodiment 10 the element 18 is preferably machine 18 which is preferably a DC motor 18 and it more specifically is preferably a permanent magnet motor 18 having an armature 23 with a permanent magnet. A current sensor 20 which is preferably an electro-mechanical control circuit 20 that senses the size of the current I flowing into the capacitor 14. The sensor 20 is essentially a means for determining the degree of current flow I into the energy storage device 14. The sensor 20 is connected to a means for altering the back EMF (electromotive force) 22 of the motor 18. The motor 18 has a rotor 25 having field windings 26. The means for altering the back EMF 22 includes exposed taps 24 of the field windings 26 of the motor 18. The means for altering the back EMF 22 is preferably a variac solenoid 22 which has a conductive wiper 27 engaging the exposed taps 24. The sensor 20 may be incorporated in the motor 18. As the rotational speed of the motor increases the back electromotive force (EMF) will increase the voltage $V_0(t)$ tending to decrease the current I. If there were no taps 24 on the input field windings 26 (or no other component for altering the current I), the increasing speed of the motor 18 will eventually become large enough to effectively cut off the current I. A speed sensor 52 is preferably included and connected to the motor 18, the Speed sensor is also connected to the means for altering the back emf 22. By providing data to the means for altering the back emf 22, it enables the means for altering the back emf 22 to maintain the speed of the motor 18 at a desired constant speed by altering the inductance of the field windings 26. No matter how the current I is manipulated, the final charge on the capacitor will be the same value, Q. No matter how much energy flows into motor 18 it will be bounded by ½VQ.

Figure 4:
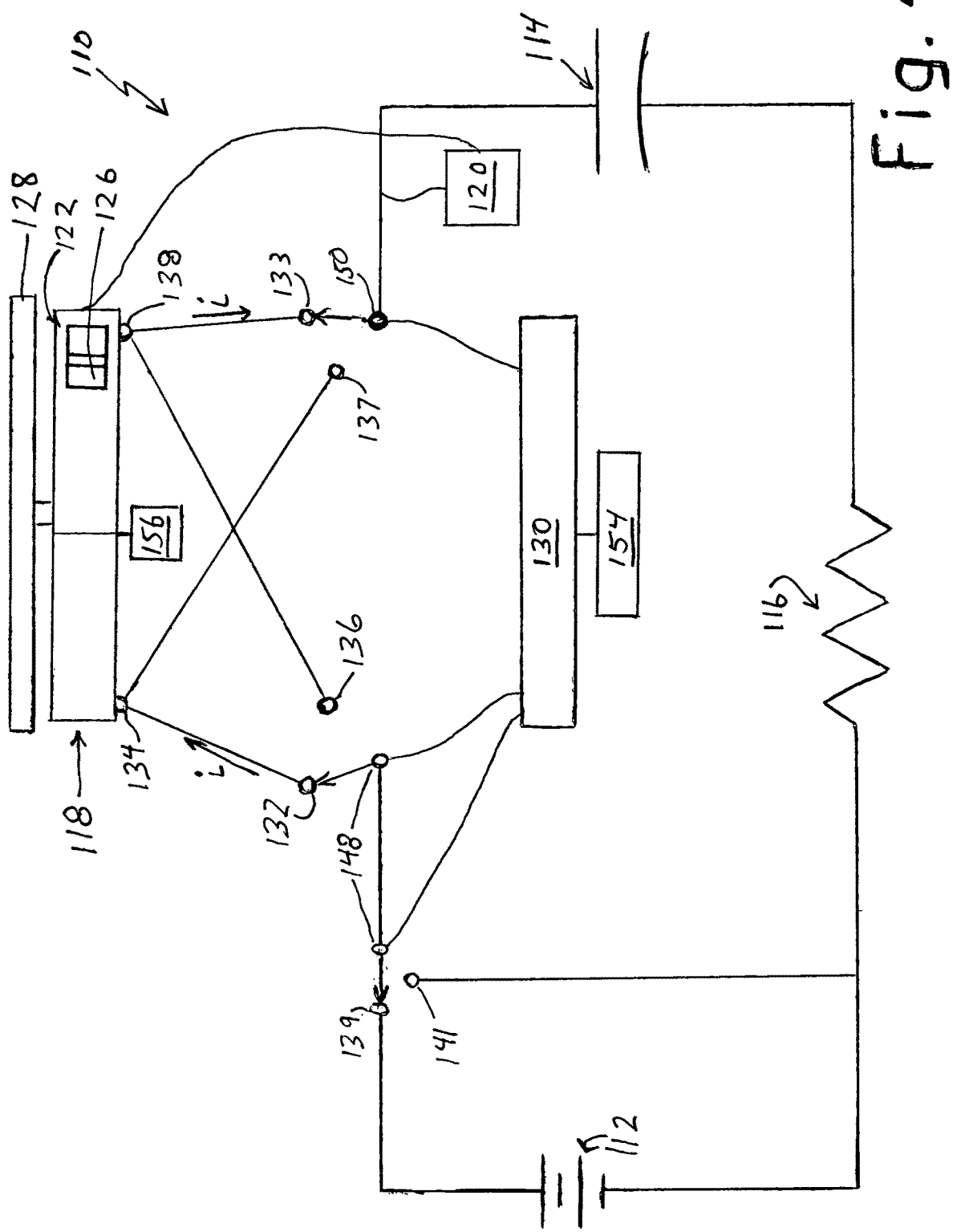
FIG. 4 is a schematic view of a second embodiment of the present invention showing an electric circuit system incorporating the flywheel component of the energy storage and release device used to store energy and also showing the motor and illustrating current flowing through the motor in a forward direction and the motor receiving power from the power source in its first mode of operation.

FIG. 4 shows a second embodiment 110 of the invention. Embodiment 110 is similar to embodiment 10 except that embodiment 110 incorporates a flywheel 128. As with embodiment 10, embodiment 110 similarly includes a power source which is preferably a battery 112, a capacitor 114, a resistor 116 and a permanent magnet motor 118 having field windings 126 as well as a current sensor 120. In the first embodiment 10, nearly all the energy that would have gone into heat is directed into rotational energy via a motor 18. This energy can be captured in a rotating flywheel 128 and retrieved in known ways. However, in many cases, this can be a large amount of energy, on the order of the amount of energy stored in the capacitors 14 and 114. That would imply a flywheel system that could be very costly. The situation can be remedied if a smaller flywheel is used to store incremental amounts of energy that are fed back into the system periodically. This smaller flywheel system can be made cost effective and could be considered analogous to the regenerative braking system in electric automobiles. Ideally, at the end of the charging cycle the energy in the flywheel 128 is zero meaning all the energy from the source went into the capacitor 114, minus a small amount dissipated in heat.

Figure 5:
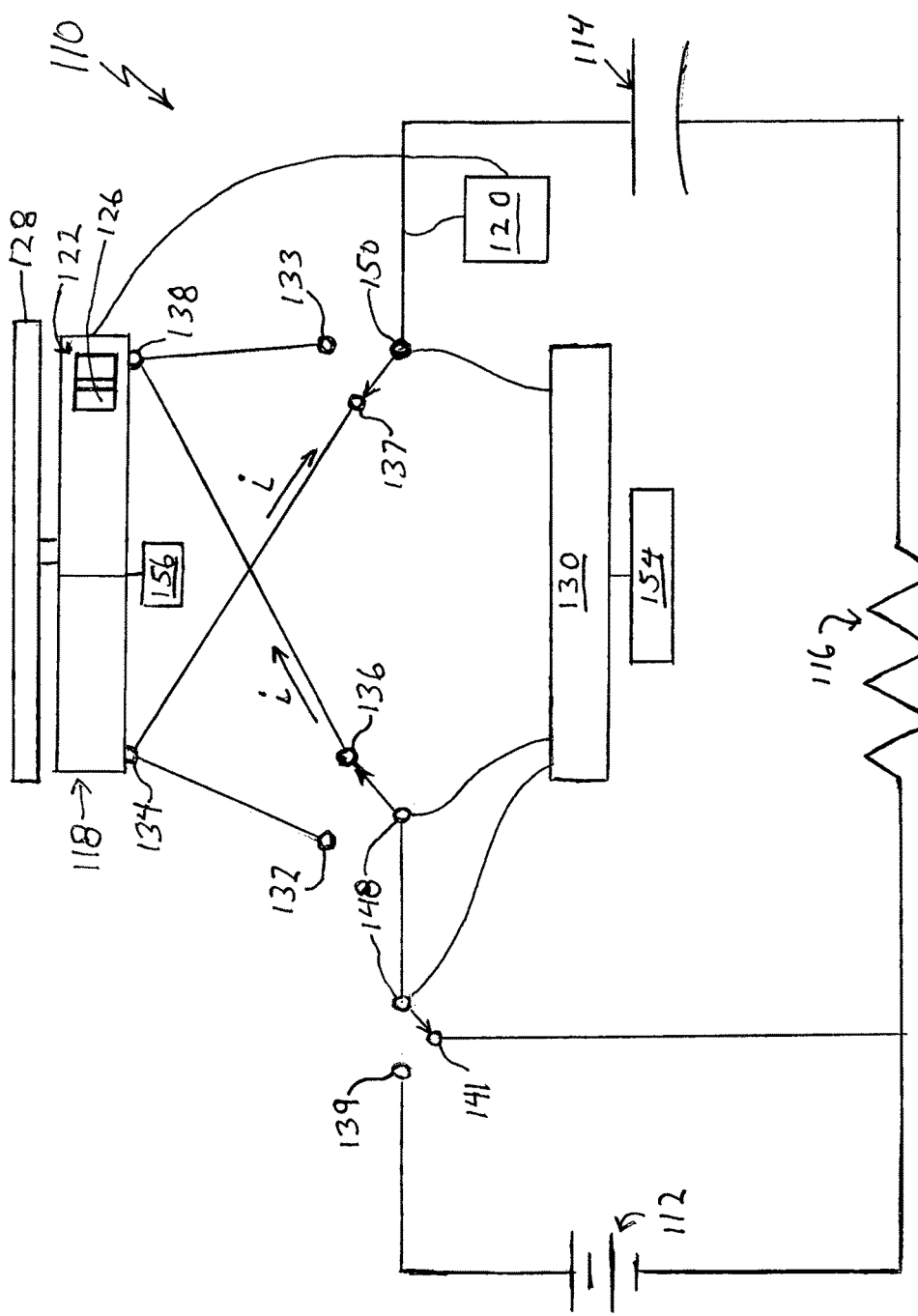
FIG. 5 is a schematic view of the second embodiment of the present invention basically showing that shown in FIG. 4 except that the wire connections to the motor are reversed so that current is flowing through the motor in a reverse direction and the wire connections switch open the connection to the power supply thereby excluding the power source from supplying power within the circuit in its second mode of operation.

In embodiment 110, charging of the capacitor 114 is done in phases. In alternate phases the connection to the motor 118 is switched so that the current goes in either one direction or so that it goes in the other (reverse) direction. In the forward phase shown in FIG. 4, the flywheel 128 develops rotational kinetic energy by absorbing power from the power source 112. In the reverse phase shown in FIG. 5, the energy in the flywheel is fed back into the circuit and into the capacitor 114. The timing of the phases is such as to minimize the final energy of the flywheel 128, preferably to zero. The capacitor 114 may be a rechargeable battery 114. As with embodiment 10, embodiment 110 includes a means for altering back emf 122 which is the same in function to 22 of embodiment 10.

A switch 130 is incorporated and utilized to select the desired phase of operation of the motor 118. The switch 130 is electrically connected to first wiring connection 132 which is electrically connected to the first terminal 134 of the motor 118 via wire lead 140 and electrically connected to the second wiring connection 136 which is electrically connected to the second terminal 138 of the motor 118 via wire lead 144. The switch 130 is also connected to the sixth wiring connection 148. The switch 130 is also electrically connected to third wiring connections 133 which is electrically connected to the second terminal 138 via wire lead 142 and electrically connected to the fourth wiring connection 137 which is electrically connected to the first terminal 134 via wire lead 146. The switch 130 is also electrically connected to the capacitor connection 150. The switch 130 is also electrically connected to power source wiring connection 139 which is connected to the power source 112 and to fifth wiring connection 141 which is connected to the capacitor 114, as shown. The switch 130 is preferably three SPDT switches. In its first (or forward) mode of operation the switch 130 selectively interconnects connection 132 to the power source connection 148 and connection 133 to the capacitor connection 150. With these connections interconnected so as to put it in the first mode, the motor 118 is able to receive current I from the power source 112 for powered operation of the motor 118. In its second (or reverse) mode of operation the switch 130 selectively interconnects connection 136 to the sixth wiring connection (preferably a pair of connections) 148 and the connection 137 to the capacitor connection 150. The switch 130 also connects the sixth wiring connection 148 to the fifth wiring connection 139 effectively taking the power source 112 out of the circuit 110. With these connections interconnected so as to put it in the second mode, the motor 118 is in a generating wiring configuration and thus able to output electrical current to the capacitor or chargeable battery 114.

In the forward mode of operation the motor 118 gains energy and angular speed. This creates a back emf, E, that subtracts from the applied voltage, V, so that the capacitor 114 has the voltage (V−E) as input. As current continues to flow through the motor 118 and capacitor 114 the voltage on the capacitor 114, VC, increases so that the voltage across the capacitor 114 is continually rising and the source is seeing a potential difference that is Z=(V−E−VC) being applied to the capacitor 114. The value of Z continues to decrease as the capacitor 114 charges, slowing the current flow and subsequently the back emf, E. The slowing of the current might extend the charging time indefinitely as the current decreases. A strategy to end the charging cycle is to go into an alternate reverse mode so that the voltage becomes Z=(V+E−VC). In this mode the voltage to the capacitor 114 is increased and the current flowing effectively is slowing the rotation. Ideally the rotation of the motor 118 will go to zero, at which time all the energy output of the source is in the capacitor 114, minus motor losses and resistive heating. Control of the current through the motor 118 can be accomplished with various appropriate known methods. More than one motor can be in the circuit performing the same functions. Most ordinary motors are usually optimized for maximum torque. An optimal motor for this invention would be optimized for maximum back emf.

In the forward mode the motor 118 and the capacitor 114 are both increasing in energy. It should be noted that the back emf due to the rotation of the motor armature is always in the same direction. As the motor 118 gains energy the back emf always is polarized so as to diminish the voltage to the capacitor 114. The motor energy is analogous to energy dissipated as heat in the circuit resistance. The capacitor 114 cannot be fully charged optimally in the forward mode. At some point the sum of the voltage on the capacitor 114 plus the back emf will equal the input voltage and the current will drop to zero, with the motor 118 still spinning and having a portion of the energy from the power source 112 as rotational energy that did not go into the capacitor 114. To optimally absorb energy from the power source 112 with minimal wasted energy in the motor 118 the reverse mode must be utilized.

In the reverse mode, the current to the motor 118 is reversed but the current to the capacitor 114 continues to flow in the original direction, adding charge to the capacitor 114. Because of the reversal of the back emf, energy of the motor 118 is continually, drained into the capacitor 114, analogous to regenerative energy braking in electric automobiles. This continual draining of the motor energy will drive its energy to zero and if nothing else is done, the motor 118 will resume turning but in the opposite direction. So, the reverse mode morphs into the forward mode automatically. When the motor energy goes to zero, before it reverses direction, it is evident that all the energy expended by the power source 112, minus motor losses and heat losses, resides in the capacitor 114. Successively switching to reverse mode when the current goes to near zero in the forward mode will ultimately charge the capacitor 114 in an optimal manner. Using a simple logic system that can be embodied with either electronics or latching relays, charging can be thereby automated. Kept connected to the power source 112 the circuit can become a trickle charger after fully charging the capacitor 114 (or battery).

A timer 154 is provided as a means for controlling the switch 130. Timer 154 is connected to the switch 130 and controls its operation based on predetermined periods wherein the motor 118 is in the first mode and the second mode. The timer cycles these periods until the capacitor 114 is charged to the level desired. The duration of these periods are preferably the same but may be different, if so desired.

Control circuitry 156 is included and connected to the motor 118. The control circuitry limits the current flow into and out of the motor 118 in the forward and reverse modes. Limiting current flow minimizes heat generation. Additionally, limiting current flow facilitates the emptying of the motor of energy at the end of the charging process and ensures all energy in the motor is transferred into the capacitor at the end of the charging process.

In the described circuitry shown in the Figures, the power source 12 and 112 voltage is V (volts), the current is I (amperes), the capacitor 14, 114 has value C (farads) and the resistor has value R (ohms). The motor 118 and flywheel 128 acting in combination as a circuit element are modeled for explanatory purposes as an element that regulates the current to the capacitor by temporarily storing energy and modulating the voltage to the capacitor.

The back emf, E, response of the motor is proportional to its angular speed, $\omega$. This angular speed is driven by a torque proportional (ignoring friction) to the current in the motor:

$$D = -K\int i\,dt$$

This is the response of a capacitor $-1/K$ in series with C and together they are equivalent to a single capacitor with value $M = C/(1-CK)$. The differential equation is:

$$V = (1/M)\int i\,dt + IR$$

This can be solved for the current as a function of time $I = i_0 e^{-t/MR}$ The value of K increases as the moment of inertia of the flywheel decreases. For all values of K, the current rate during charging is relatively slowed by introducing the motor 118 and flywheel 128 in combination, until voltage across capacitor 14, 114 equals V. Then the energy in the capacitor 14, 114 is half the energy output of the power source 12 and 112 having a value V. The rest of the energy is in K and R independent of the values of the capacitor 14, 114, the resistor and K. For KC near unity nearly half the energy appears in the motor 118 and flywheel 128 combination, with little going to heat the resistor. This is achieved in practice.

The energy absorbing and releasing device 18, 118 in series with the charging current I is able to extract energy from the flow. The energy absorbing and releasing device 18, 118 can be a motor 18, 118 (rotational energy-driven by I), an inductor (stores energy in a magnetic field) or a capacitor (stores energy in its electric field). Current feeds into the motor 118 via conductive wires 140 and 142 in the forward mode. In the reverse mode the wires 144 and 146 allow current to flow out of the motor 118 and this leads to a reversal of the current traversing the motor 118. As the motor 118 accumulates energy and draws it out of the circuit, a point can be reached where the wire leads 140 and 142 are suddenly connected in the reverse mode, allowing the energy in the motor 118 to flow back into the charging circuit.

The control circuitry 156 is preferably electromechanical control circuitry 156. This type of circuitry 156 allows modifications to motors and inductors to limit rate-of-current flow, especially when the reverse mode turns on. Similarly storage capacitors can be rearranged. The ultimate aims are two-fold: 1) limit current flow to minimize heat generation, and 2) empty motor of energy and charge at the end of the full charging cycle so that the energy to the capacitor 14, 114 being charged is maximized and all the source charge and energy is in the capacitor 14, 114 minus losses.

Figure 6:
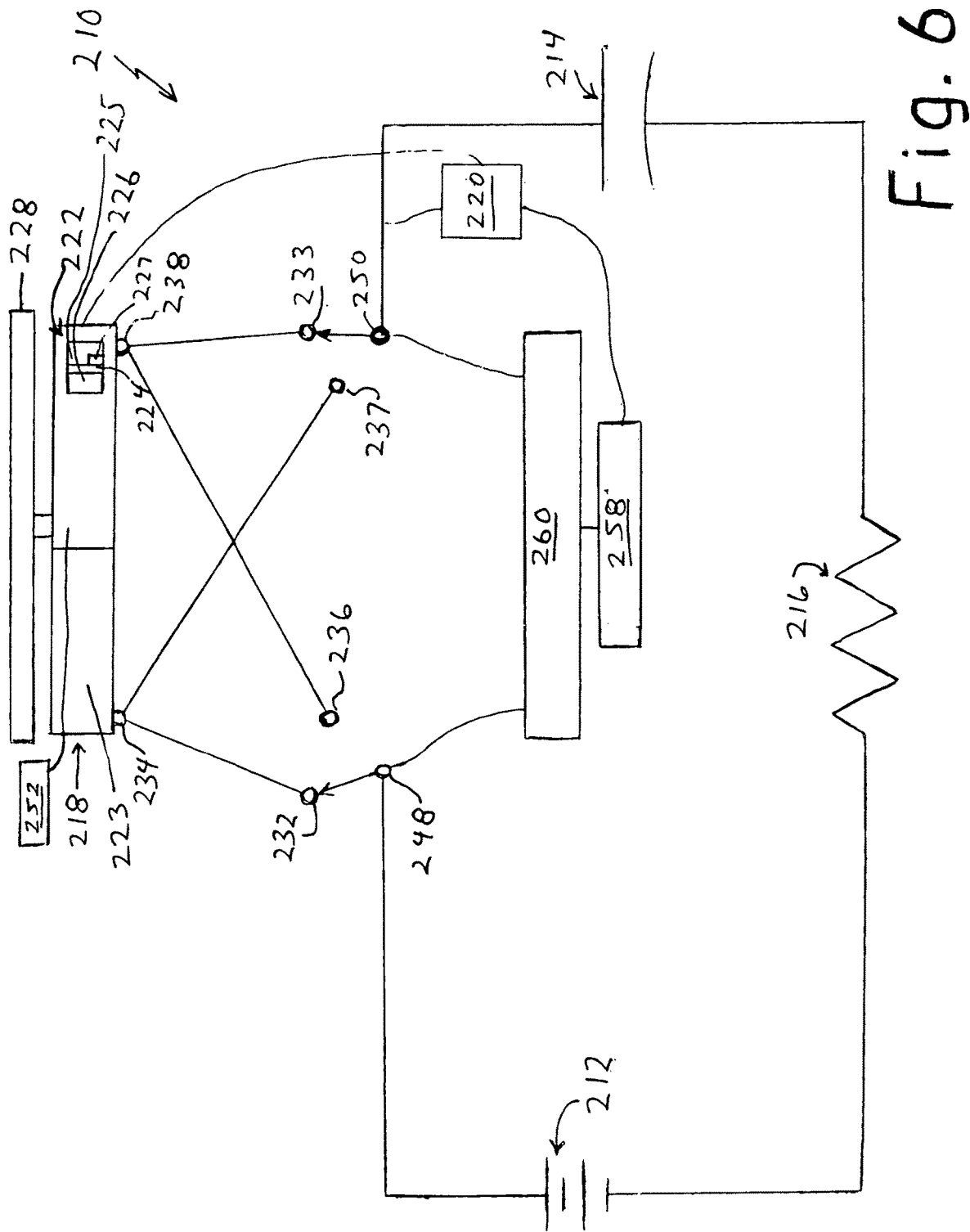
FIG. 6 is a schematic view of a third embodiment of the present invention showing its logic circuit system component and latching relays components which is similar to that of the first embodiment except that the power source is not switched into the circuit and also illustrating the direction of current flow in its first mode.
Figure 7:
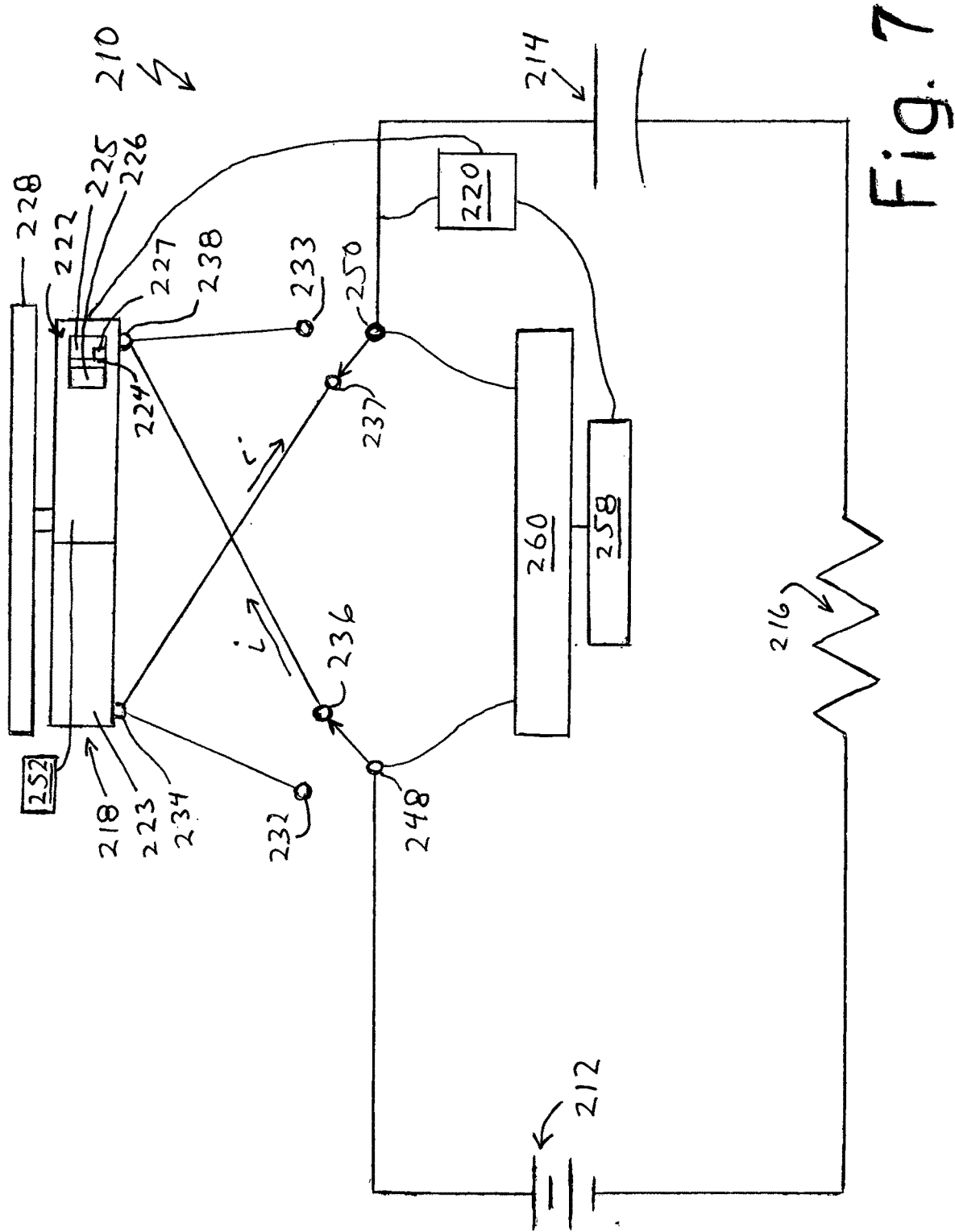
FIG. 7 is a schematic view of the third embodiment of the present invention also showing its logic circuit system and latching relays components and also illustrating the direction of current flow in its second mode similar to the first embodiment except that the power source is not switched out of the circuit.

FIGS. 6 and 7 show a third embodiment 210 of the invention. Embodiment 210 is similar to embodiments 10 and 110 except that embodiment 210 incorporates a logic circuit system 258 and latching relays 260 and does not include the timer 154 or the switch 130. As with embodiment 110, embodiment 210 similarly includes a power source which is preferably a battery 212, a capacitor 214, a resistor 216 and a motor 218 as well as a current sensor 220. The motor 218 also includes an armature 223 having taps 224 and rotor 225 having field windings 226 and conductive wiper 227. Embodiment 210 similarly also includes a flywheel 228 attached to the motor 218 for containing kinetic energy. A speed sensor 252 is also included and connected to a means for altering back emf 222 of the motor 218. These elements of embodiment 210 are the same in structure and function to correspondingly numbered elements of embodiment 10.

As an alternative to the timer 154, the logic circuit system 258 incorporating latching relays 260 is preferably included to control the forward and reverse phases of the motor 218 so as to maximize the energy contained by the capacitor 214 at the end of the charging period. The logic system is connected to sensor 220 which monitors the current flowing into the capacitor 214 and provides data regarding the current value to the logic system 258. The latching relays 260 are connected to the connections 232, 233, 236, 248 and 250 for switching the motor 218 into desired first or second mode as described with regard to the switch 230. At the inception of the charging process, the motor 218 and capacitor 214 receive electrical current I from the power source 212 such the motor 218 is driven thereby and the capacitor 214 by current flowing from the power source 212. In this first mode (forward mode) shown in FIG. 6, the motor 218 is converting energy that would otherwise go into heat into kinetic energy and such kinetic energy is stored in the flywheel 228. When the current flowing into the capacitor approaches zero, the logic circuit system signals the relays 260 to put the motor 218 into reverse mode (second mode) shown in FIG. 7 for charging the capacitor 214 via current flowing from the motor 218 and thereby receive energy therefrom that would otherwise have been wasted heat energy. Due to this process of changing from one mode to the other, the capacitor 214 receives the maximum charge it can receive directly from the power source 212 and receives the maximum charge it can receive from the motor 218 based on the maximum kinetic energy the flywheel 228 can store and transfer to the capacitor 214. The result is minimal wasted energy.

The invention claimed is:

1. An improved energy efficient system for charging an electrical energy storage device, comprising:
   an electrical power source for charging the energy storage device;
   a motor electrically connected to said power source, said motor capable of receiving electrical power and capable of providing electrical power;
   a first sensor for determining degree of electrical current flow into the energy storage device, said sensor electrically tapping into electrical current flow into the energy storage device;
   a logic circuit system electrically connected to said sensor and receiving data therefrom regarding current value of current flowing into the energy storage device and to said motor, to said electrical power source and to the energy storage device so that when current value of current flowing into said energy storage device reaches a predetermined value said logic circuit system puts said motor into a first mode of electrical current passing through said motor in a forward direction in which said motor receives electrical current from said source so that said source drives said motor and so that when current value of current flowing into said energy storage device approaches zero said logic circuit system puts said motor into a second mode of electrical current passing through said motor in a reverse direction in which said motor generates and provides electrical current to said energy storage device for charging of said energy storage device;
   a means for altering back emf of said motor, said means for altering electrically connected to said motor;
   a second sensor for determining degree of electrical current flow into said energy storage device said second sensor electrically tapping into current flow into said energy storage device and electrically connected to said means for altering to alter back emf of said motor in accordance with desired parameters of degree of electrical current flow into said energy storage device.

2. The system of claim 1 wherein said has an armature including a permanent magnet and a rotor having field windings.

3. The system of claim 1 further including a means for monitoring speed of said motor to enable said means for altering back emf to alter emf so that speed of said motor is thereby kept constant.

4. An improved energy efficient system for charging an electrical energy storage device, comprising:
   an electrical power source for charging the energy storage device;
   a DC motor, said motor having an armature including a permanent magnet and a rotor having field windings, said motor electrically connected to said power source, said motor capable of receiving electrical power and capable of providing electrical power;

a means for altering back emf of said motor, said means for altering electrically connected to said motor;

a switch electrically connected to said motor, to said electrical power source and to the energy storage device for switching between a first mode of electrical current passing through said motor in a forward direction in which said motor receives electrical current from said source so that said source drives said motor and a second mode of electrical current passing through said motor in a reverse direction in which said motor generates and provides electrical current to said energy storage device for charging of said energy storage device;

a means for determining degree of electrical current flow into the energy storage device, said means for determining electrically tapping into current flow into the energy storage device and electrically-connected to said means for altering back emf of said motor, said means for determining enabling said means for altering to alter back emf of said motor in accordance with desired parameters of degree of electrical current flow into said energy storage device.

5. The system of claim 4 wherein said means for altering back emf includes a variac solenoid, said variac solenoid including windings for use as field windings for said motor.

6. The system of claim 4 wherein said means for altering is connected to field windings of said motor for alteration of inductance of the field windings.

7. The system of claim 4 wherein said means for altering includes a means for altering current going through the field windings of said motor, said means for altering connected to said source and to said motor, said means for altering enabling current flow to be constant.

8. The system of claim 4 where said means for altering includes taps for selectively connecting at least one of said taps to said power source for altering the back emf.

9. The system of claim 8 wherein said means for altering is directly connected to said taps.

10. The system of claim 1 wherein said energy storage and release device includes an inductor.

11. The system of claim 1 wherein said energy storage and release device includes a flywheel system.

12. In an electrical circuit for charging an energy storage device, a system for capturing electrical energy otherwise lost to circuit resistance heat, comprising:

an electrical power source for charging the energy storage device;

a motor electrically connected to said power source, said motor capable of receiving electrical power in the circuit for driving said motor and capable of providing electrical power to the circuit;

a switch electrically connected to a first wiring connection which is electrically connected to a first terminal of said motor and a second wiring connection which is electrically connected to said electrical power source to provide selective electrical connection and disconnection of said electrical power source from said motor and electrically connected to a seventh wiring connection which is electrically connected to said energy storage device to also provide selective electrical connection and disconnection of said electrical power source from said energy storage device, said switch electrically connected to a third wiring connection which is electrically connected to a second terminal of said motor and an energy storage wiring connection which is electrically connected to said energy storage device and electrically connected to a fifth wiring connection which is electrically connected to said first terminal to provide selective electrical connection and disconnection of said motor from said energy storage device, and selective electrical connection and disconnection of said motor to said electrical power source and to the energy storage device for switching between a first mode of electrical current passing through said motor in a forward direction in which said motor receives electrical current from said source so that said source drives said motor and a second mode of electrical current passing through said motor in a reverse direction in which said motor generates and provides electrical current to said energy storage device for charging of said energy storage device.

13. The system of claim 12 further including a means for controlling said switch.

14. The system of claim 13 further including a means for determining degree of electrical current flow into the capacitor, said means for determining electrically tapping into electrical current flow into the capacitor.

15. The system of claim 14 wherein said means for determining degree of electrical current flow is electrically connected to said switch, said means for determining electrically connected to said means for controlling to enable said means for controlling to switch between the first mode and the second mode in accordance with pre-selected parameters of degree of current flow.

16. The system of claim 12 further including a means for altering back emf of said motor, said means for altering electrically connected to said motor.

17. In an electrical circuit for charging a capacitor, a system for capturing electrical energy otherwise lost to circuit resistance heat, comprising:

an electrical power source for charging the capacitor;

a motor electrically connected to said power source, said motor capable of receiving electrical power in the circuit for driving said motor and capable of providing electrical power to the circuit;

a switch electrically connected to said motor and to said electrical power source for switching between a first mode of electrical current passing through said motor in a forward direction in which said motor receives electrical current from said source so that said source drives said motor and a second mode of electrical current passing through said motor in a reverse direction in which said motor generates and provides electrical current to said capacitor for charging of said capacitor;

a means for determining degree of electrical current flow into the capacitor, said means for determining electrically tapping into electrical current flow into the capacitor;

a means for altering back emf of said motor, said means for altering electrically connected to said motor;

said means for determining degree of electrical current flow into the capacitor is electrically connected to said means for altering back emf of said motor, said means for determining enabling said means for altering to alter back emf of said motor by altering inductance of field windings of said motor to maintain rotation of said motor at a predetermined desired constant speed and to maintain electrical power going into said capacitor at a constant current in accordance with predetermined parameters of desired degree of electrical current flow into said capacitor.

18. In an electrical circuit for charging a capacitor, a system for capturing electrical energy otherwise lost to circuit resistance heat, comprising:
- an electrical power source for charging the capacitor;
- a motor electrically connected to said power source, said motor capable of receiving electrical power in the circuit for driving said motor and capable of providing electrical power to the circuit;
- a switch electrically connected to said motor and to said electrical power source for switching between a first mode of electrical current passing through said motor in a forward direction in which said motor receives electrical current from said source so that said source drives said motor and a second mode of electrical current passing through said motor in a reverse direction in which said motor generates and provides electrical current to said capacitor for charging of said capacitor;
- a means for altering back emf of said motor, said means for altering electrically connected to said motor, said means for altering includes a variac solenoid including windings for use as field windings in said motor, said variac solenoid enabling alteration of inductance of the field windings to maintain speed of said motor at a desired predetermined constant.

19. The system of claim 18 further including a speed sensor connected to said motor, said speed sensor also connected to said means for altering to facilitate maintaining speed of said motor and a desired predetermined constant.

20. The system of claim 18 wherein said means for altering includes bare wiring portions of said field windings for providing direct electrical connection to said field windings and includes a conductive wiper for selective electrical connection of said power source to selected locations on said bare wiring portions of said field windings for alteration of back emf of said motor via alteration of inductance provided by said field windings.

21. An improved energy efficient system for charging an electrical energy storage device, comprising:
- an electrical power source for charging the energy storage device;
- an energy storage and release device electrically connected to said power source, said energy storage and release device capable of receiving electrical power and capable of providing electrical power;
- a first sensor for determining degree of electrical current flow into the energy storage device, said sensor electrically tapping into electrical current flow into the energy storage device;
- a logic circuit system electrically connected to said sensor and receiving data therefrom regarding current value of current flowing into the energy storage device and to said energy storage and release device, to said electrical power source and to the energy storage device so that when current value of current flowing into said energy storage device reaches a predetermined value said logic circuit system puts said energy storage and release device motor into a first mode of electrical current passing through said energy storage and release device in a forward direction in which said energy storage and release device receives electrical current from said source so that said source drives said energy storage and release device and so that when current value of current flowing into said energy storage device approaches zero said logic circuit system puts said energy storage and release device into a second mode of electrical current passing through said energy storage and release device in a reverse direction in which said energy storage and release device generates and provides electrical current to said energy storage device for charging of said energy storage device.

* * * * *